(No Model.)
E. BLOCH.
OPERA GLASSES.
No. 565,596. Patented Aug. 11, 1896.
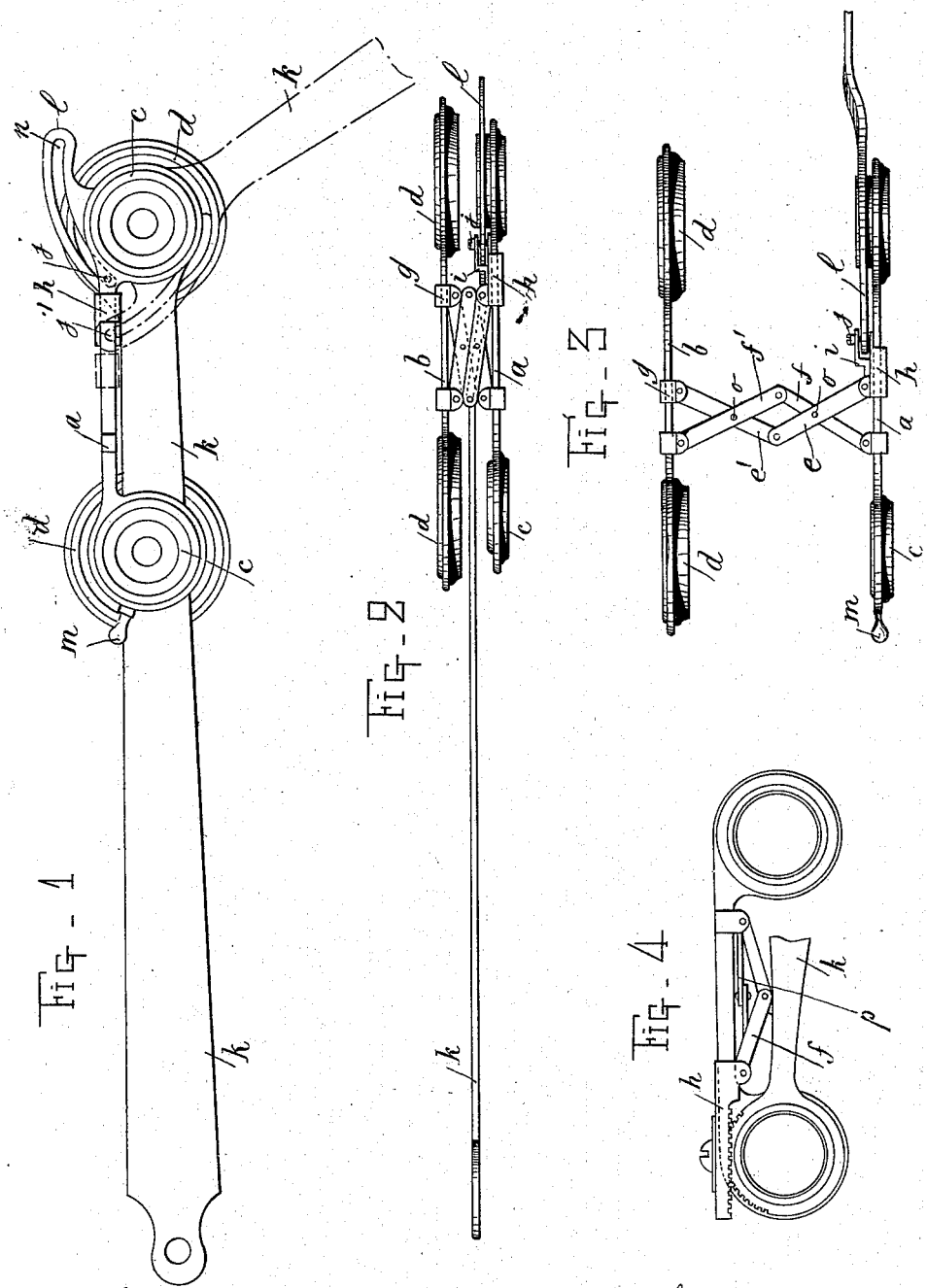
Witnesses.
J. C. Lebret
E. Block.
Inventor.
Edmond Bloch,
By H. A. de Vos.
Attorney.

UNITED STATES PATENT OFFICE.

EDMOND BLOCH, OF PARIS, FRANCE.

OPERA-GLASS.

SPECIFICATION forming part of Letters Patent No. 565,596, dated August 11, 1896.

Application filed June 3, 1896. Serial No. 594,140. (No model.) Patented in France October 7, 1895, No. 250,782.

*To all whom it may concern:*

Be it known that I, EDMOND BLOCH, a citizen of the Swiss Republic, residing at Paris, France, have invented certain new and useful Improvements in Opera-Glasses, (for which I have obtained a patent in France, No. 250,782, dated October 7, 1895,) of which the following is a specification.

My invention relates to a collapsible binocular glass wherein the object-lenses and the ocular lenses are distanced and focused by means of the handle.

When closed, the opera-glass is very small, (about fifteen millimeters thick,) and the lenses are placed in the desired position by means of the handle, the end of which is jointed to the right-side ocular, forming there an eccentric slide and acting upon a system of lazy-tongs, which is extended, thus placing the lenses at the proper distance simply by pushing the handle downward.

My invention is fully shown and described in the following specification, of which the accompanying drawings form a part, the same letters of reference indicating the same parts in the several figures, and wherein—

Figure 1 is a plan view of the opera-glass in collapsed position, the handle being also shown in dotted lines in the position when the lenses are placed at the greatest distance from each other. Fig. 2 is a side view of the opera-glass in collapsed position. Fig. 3 is a side view of the opera-glass in open position, the lenses being positioned at the greatest possible distance from each other. Fig. 4 shows a modified arrangement of the mechanism operating the lenses.

As shown, the opera-glass is formed of two frames $a$ and $b$, the former carrying the oculars $c$ and the latter the objectives $d$. These frames are connected to each other by means of lazy-tongs, the links $e$, $e'$, $f$, and $f'$ being pivoted together at $o$. The links $e$ and $e'$ are pivoted to pieces $h$ and $g$, sliding on the frames $a$ and $b$, while the links $f$ and $f'$ are also pivotally connected with the frames $a$ and $b$, these pivot-points being stationary. The slide-piece $h$ is provided at its inner side with a cheek $i$, through which passes a pin $j$, engaged in an eccentric slot $n$, formed in a part of the handle $k$. The handle $k$ turns around the right-side ocular lens and is provided with a cam $l$, in which is formed a slot $n$, eccentric to the axis of rotation of the handle. In this slot moves the pin $j$. From this description it is obvious that by moving the handle $k$ from its position of rest, as shown in full lines in Fig. 1, to the position shown in dotted lines the eccentric slot formed in the cam $l$ will cause the pin $j$ to assume the position shown by $j'$, and consequently the links $e$ and $e'$ will be acted upon and the lenses will be moved apart.

It will be readily seen that the lenses may be placed at any desired distance so as to suit the eyes of the user. As soon as the suitable distance is obtained the downward motion of the handle is stopped, the device being locked at any position. In the drawings only the two extreme positions are shown.

At the left-side ocular a knob $m$ is arranged to hold the device when the handle $k$ is being manipulated for closing or focusing the opera-glass.

In Fig. 4 I have illustrated a modified construction for moving the lenses. In this construction the part of the handle $k$ surrounding the ocular is provided with teeth gearing with a rack formed on the sliding piece $h$, which acts on the links of the lazy-tongs. For the sake of rigidity I connect the sliding piece $h$ by a broken link $p$ to the rigid pivot-point of the other link.

I do not desire to limit myself to the exact construction of the parts as herein shown and described; but

What I claim as new, and desire to secure by Letters Patent, is—

1. In a collapsible binocular glass, the combination with the ocular and object lenses carried by frames, of lazy-tongs connecting said frames, an operating-handle, and means connecting said handle with the lazy-tongs to effect the adjustment of the latter, substantially as described.

2. In a collapsible binocular glass, the combination with the frames carrying ocular and object lenses, of lazy-tongs connecting said frames, a handle pivoted to one of said frames and means connecting said handle with a free end of the lazy-tongs, substantially as described.

3. In a collapsible binocular glass, the combination with the frames carrying ocular and object lenses, of lazy-tongs having at a free end a sliding member traveling upon one of said frames, and a pivoted handle engaging said sliding member, substantially as described.

4. In a collapsible binocular glass, the combination with the frames carrying the ocular and object lenses, of lazy-tongs having a free end provided with a sliding member to travel on one of said frames, and a pivoted handle provided with a cam-surface to engage and operate said sliding member, substantially as described.

In testimony that I claim the foregoing I have hereunto set my hand this 5th day of May, 1896.

EDMOND BLOCH.

Witnesses:
EDWARD P. MACLEAN,
VICTOR MATEAUX.